US011959425B2

(12) United States Patent
Persson et al.

(10) Patent No.: US 11,959,425 B2
(45) Date of Patent: Apr. 16, 2024

(54) METHOD FOR CONTROLLING A VALVE ARRANGEMENT (71) Applicant: VOLVO TRUCK CORPORATION, Gothenburg (SE)

(72) Inventors: Per Persson, Partille (SE); Martin Svensson, Kungsbacka (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 42 days.

(21) Appl. No.: 17/756,010

(22) PCT Filed: Nov. 13, 2019

(86) PCT No.: PCT/EP2019/081212
§ 371 (c)(1),
(2) Date: May 13, 2022

(87) PCT Pub. No.: WO2021/093949
PCT Pub. Date: May 20, 2021

(65) Prior Publication Data
US 2022/0389878 A1 Dec. 8, 2022

(51) Int. Cl.
*F02D 13/02* (2006.01)
*F01L 1/053* (2006.01)
(Continued)

(52) U.S. Cl.
CPC .......... *F02D 13/0207* (2013.01); *F01L 1/053* (2013.01); *F01L 1/344* (2013.01);
(Continued)

(58) Field of Classification Search
CPC ....... F01L 1/053; F01L 1/344; F01L 13/0015; F01L 2001/0537; F01L 2001/34496;
(Continued)

(56) References Cited

U.S. PATENT DOCUMENTS 11,255,226 B2 * 2/2022 Baltrucki ................ F01L 1/267
2009/0084333 A1 4/2009 Cleary et al.
(Continued)

FOREIGN PATENT DOCUMENTS

CN 105264202 A 1/2016
DE 19913316 A1 12/1999
(Continued)

OTHER PUBLICATIONS

International Search Report and Written Opinion in corresponding International Application No. PCT/EP2019/081212 dated Aug. 10, 2020 (10 pages).
(Continued)

*Primary Examiner* — Kenneth J Hansen
*Assistant Examiner* — Kelsey L Stanek
(74) *Attorney, Agent, or Firm* — Venable LLP; Jeffri A. Kaminski (57) ABSTRACT A method for controlling a valve arrangement for an internal combustion engine, the valve arrangement including a piston arrangement comprising a piston having a piston end portion facing an inlet valve of the valve arrangement. The method includes receiving a signal indicative of a temperature level of an exhaust gas after treatment system and when the signal indicates a temperature level below a predetermined threshold level: advancing an exhaust event of the internal combustion engine; and controlling the piston arrangement for reducing the distance between the piston end portion and the inlet valve before the internal combustion engine assumes an air intake event.

17 Claims, 5 Drawing Sheets (51) Int. Cl.
  *F01L 1/344* (2006.01)
  *F01L 13/00* (2006.01)
  *F02D 41/02* (2006.01)
  *F02D 41/00* (2006.01)

(52) U.S. Cl.
  CPC ...... *F01L 13/0015* (2013.01); *F02D 13/0265* (2013.01); *F02D 41/0245* (2013.01); *F01L 2001/0537* (2013.01); *F01L 2001/34496* (2013.01); *F01L 2013/105* (2013.01); *F01L 2201/00* (2013.01); *F01L 2820/01* (2013.01); *F02D 2041/001* (2013.01); *F02D 2200/0802* (2013.01)

(58) Field of Classification Search
  CPC ............. F01L 2013/105; F01L 2201/00; F01L 2820/01; F02D 13/0207; F02D 13/0265; F02D 41/0245; F02D 2041/001; F02D 2200/0802
  USPC ....................................... 123/90.15
  See application file for complete search history.

(56) References Cited

U.S. PATENT DOCUMENTS

| 2014/0283771 A1* | 9/2014 | Mukaide | F01L 13/0063 |
| | | | 123/90.15 |
| 2015/0354418 A1* | 12/2015 | Jo | F02D 13/04 |
| | | | 123/90.43 |
| 2016/0356187 A1* | 12/2016 | Meneely | F01L 13/06 |

FOREIGN PATENT DOCUMENTS

| DE | 102012012322 A1 | 12/2013 |
| DE | 102016124918 A1 | 6/2018 |
| WO | 2018197954 A2 | 11/2018 |

OTHER PUBLICATIONS

International Preliminary Report on Patentability in corresponding International Application No. PCT/EP2019/081212 dated Nov. 20, 2020 (7 pages).

Chinese Office Action dated Jan. 31, 2024 in corresponding Chinese Patent Application No. 201980102159.5, 20 pages.

* cited by examiner

METHOD FOR CONTROLLING A VALVE ARRANGEMENT

CROSS-REFERENCE TO RELATED APPLICATIONS

This application is a U.S. National Stage application of PCT/EP2019/081212, filed Nov. 13, 2019 and published on May 20, 2021, as WO 2021/093949, all of which is hereby incorporated by reference in its entirety.

TECHNICAL FIELD

The present disclosure relates to a method for controlling a valve arrangement. The method is particularly applicable for internal combustion engines of vehicles. Although the method will mainly be described in relation to a truck, it may also be applicable for other types of vehicles propelled by means of an internal combustion engine. The present disclosure also relates to a corresponding valve arrangement, as well as a vehicle comprising such a valve arrangement.

BACKGROUND

For many years, the demands on internal combustion engines have been steadily increasing and engines are continuously developed to meet the various demands from the market. Reduction of exhaust gases, increasing engine efficiency, i.e. reduced fuel consumption, and lower noise level from the engines are some of the criteria that becomes an important aspect when choosing vehicle engine. Furthermore, in the field of trucks, there are applicable law directives that have e.g. determined the maximum amount of exhaust gas pollution allowable.

Conventionally, a combustion cylinder of an internal combustion engine comprises an inlet valve and an exhaust valve, wherein the inlet valve is arranged in an open position at an intake event during the downward motion of a piston in the combustion cylinder. The inlet valve is thereafter closed when the piston reaches the bottom dead center of the cylinder, and is closed during the combustion phase and the exhaust event, and opened again when the piston reaches the top dead center for the next coming intake event. The exhaust valve on the other hand is closed during the intake event, the compression phase, the combustion phase and the expansion phase. Thereafter, when the piston leaves the bottom dead center after the expansion phase, the exhaust valve is open during the exhaust event.

Although this conventional operation of an internal combustion engine has been proven successful, there is however a desire to further optimize operation during at least some operating conditions. It is for example a desire to improve heating of the exhaust flow for reducing the time period until the exhaust gas aftertreatment system reaches the so-called light off temperature.

SUMMARY

It is an object of the present disclosure to describe a method for controlling a valve arrangement which at least partially overcomes the above described deficiencies. This is achieved by a method according to claim 1.

According to a first aspect, there is provided a method for controlling a valve arrangement of an internal combustion engine comprising an exhaust gas aftertreatment system, the valve arrangement comprising at least one inlet valve configured to be arranged in an open position during an air intake event of the internal combustion engine, and at least one exhaust valve configured to be arranged in an open position during an exhaust event of the internal combustion engine; the valve arrangement further comprising a piston arrangement comprising a piston having a piston end portion facing the inlet valve, the piston being arranged to controllably position the inlet valve in the open position, wherein the piston end portion and the inlet valve are arranged at a distance from each other when the inlet valve is arranged in a closed position; the method comprising the steps of receiving a signal indicative of a temperature level of the exhaust gas aftertreatment system and when the signal indicates a temperature level below a predetermined threshold level: advancing the exhaust event of the internal combustion engine; and controlling the piston arrangement for reducing the distance between the piston end portion and the inlet valve before the internal combustion engine assumes the air intake event.

The wording air intake event should be understood to mean the time period when the inlet valve is arranged in the open position for receiving air into the combustion chamber prior to the compression phase and the combustion phase. Likewise, the wording exhaust event should be understood to mean the time period after the combustion phase when the exhaust gases is expelled from the combustion chamber. During a "normal mode of operation", the inlet valve is opened during the intake phase when the combustion piston is positioned at the top dead center, or in the vicinity thereof. The inlet valve is thereafter arranged in the open position until the combustion piston reaches the bottom dead center, or is positioned in the vicinity thereof. During the "normal mode of operation", the exhaust valve is opened when initiating the exhaust phase and the combustion piston is arranged at the bottom dead center, or in the vicinity thereof. The exhaust valve is thereafter arranged in the open position until the combustion piston reaches the top dead center, or is positioned in the vicinity thereof.

Further, and as described above, the piston end portion of the piston arrangement and the inlet valve are arranged at a distance from each other when the inlet valve is arranged in a closed position. This should be interpreted in such a way that an upper portion of the inlet valve, which upper portion faces away from the combustion chamber of the internal combustion engine, is arranged at a distance from the piston end portion of the piston arrangement. The distance is preferably an air gap between the piston end portion and the upper portion of the inlet valve.

The wording "advancing the exhaust event" should thus be understood to mean that the exhaust valve is opened at an earlier point in time compared to the normal mode of operation. Similarly, the exhaust valve is closed at an earlier point in time compared to the normal mode of operation. The exhaust valve is thus closed during a time period before the combustion piston reaches the top dead center. An advantage of advancing the exhaust event is that the expansion work on the combustion piston is ceased at an earlier point in time and the heat from the combustion phase is blown out through the exhaust port whereby e.g. a catalyst of the exhaust gas aftertreatment system is heated. Hence, the exhaust gas aftertreatment system can be relatively rapidly heated.

However, if solely advancing the exhaust event, the combustion piston will recompress the combustion gas during the final end of the exhaust cycle. In such case, the gas temperature in the cylinder will be increased which can cause heat loss in the cylinder. Such heat loss is not wanted as the heat more preferably should be directed to the aftertreatment system. However, recompression can be avoided by also positioning the inlet valve in the open position at an earlier point in time, such as to provide a valve overlap where both the inlet valve and the exhaust valve are arranged in the open position during a short time period when the combustion piston reaches the top dead center. However, if the air intake event is advanced in a similar manner as the exhaust valve event, there is a risk that the combustion piston will interfere with the inlet valve when the combustion piston is about to reach the top dead center.

The present disclosure is therefore based on the realization that interference between the inlet valve and the combustion piston can be avoided by reducing the distance, also commonly referred to as the lash, between the piston end portion of the piston arranged to push the inlet valve in the open position before the internal combustion engine assumes the air intake event. By reducing this distance, the opening characteristics of the inlet valve will be modified such that the inlet valve will be opened to a rather low degree at an early point in time of the air intake event. The reason for this is that also a lower part of a cam lobe connected to the piston arrangement will be in connection with the inlet valve. This lower part of the cam lobe will thus initiate opening of the inlet valve but to such a low height that the inlet valve will not interfere with the combustion piston in the combustion cylinder. When the combustion piston has reached the TDC, the upper part of the cam lobe will further open the inlet valve in a "normal" manner.

By means of the above, recompression is avoided as the inlet valve and the exhaust valve will be opened by an overlap and the generated heat can be transferred to the exhaust gas aftertreatment system. Accordingly, advancing the exhaust event as well as reducing the distance between the piston end portion and the inlet valve has have a common technical effect. The above will also have the advantages of improving fuel consumption as extracted mechanical power from the crankshaft to recompress the gas will be avoided. Also, pressure pulses in the inlet charging system will be reduced, which will result in a reduction of noise.

According to an example embodiment, the step of controlling the piston arrangement may comprise the step of advancing the piston end portion towards the inlet valve until the piston end portion abuts the inlet valve.

Hereby, the piston end portion will be arranged in contact with the inlet valve such as not to open the inlet valve. Accordingly, the contact force between the piston end portion and the inlet valve is smaller than the force needed for arranging the inlet valve in the open position.

According to an example embodiment, the piston arrangement may be a fluidly controllable piston arrangement.

Preferably, the piston arrangement is controlled by hydraulic fluid. Thus, the piston arrangement is controlled to reduce the distance between the piston end portion and the inlet valve by receiving a flow of hydraulic fluid, as will be described further below.

According to an example embodiment, the piston arrangement may comprise a piston valve controllable between a low-pressure mode, in which fluid flow of a first flow pressure level is supplied towards the piston, and a high-pressure mode, in which fluid flow of a second flow pressure level is supplied towards the piston, the second flow pressure level being higher than the first flow pressure level.

The wording "low-pressure mode" and "high-pressure mode" should be construed as modes at which fluid flow of different pressure levels are supplied to the piston arrangement. The pressure levels of the low-pressure mode and the high-pressure mode can vary depending on the characteristics of the piston arrangement. Hence, the high-pressure mode may be different based on the design of the piston arrangement, such that for one type of design fluid flow may be supplied to the piston at a lower pressure level compared to a piston arrangement of another design.

According to an example embodiment, the step of controlling the piston arrangement may comprise the step of controlling the piston valve from the low-pressure mode to the high-pressure mode.

Accordingly, when there is a desire to reduce the distance between the piston end portion and the inlet valve, piston is controlled to be switched from the low-pressure mode to the high-pressure mode. This may preferably be controlled by a control unit.

According to an example embodiment, the second flow pressure level may be of such magnitude that the distance between the piston end portion and the inlet valve is reduced without arranging the inlet valve in the open position when the piston end portion abuts the inlet valve.

Hereby, the pressure level of the fluid flow is controlled to generate a force to the piston, which force is lower than the force required to arrange the inlet valve in the open position. In detail, the inlet valve is preferably biased by means of a spring. The force required to open the inlet valve must thus exceed the opposing force of the spring. The force from the fluid flow acting on the piston can be calculated by means of the flow pressure level and the cross-section area of the piston. The flow pressure level of the fluid flow is thus calculated such as to generate a force on the piston which is lower than the force from the spring.

According to an example embodiment, the valve arrangement may comprise a cam phaser connected to the exhaust valve via an exhaust cam shaft.

According to an example embodiment, the step of advancing the exhaust event may comprise the step of rotating the exhaust cam shaft, using the cam phaser, for advancing the exhaust event.

A cam phaser is relatively simple in design and can be controlled by means of e.g. receiving an electronic control signal or to be controlled by means of receiving a flow of fluid to rotate the exhaust cam shaft, and thus advance the exhaust event.

Although a cam phaser is a preferred alternative, other arrangements are also conceivable. For example, the exhaust valve may e.g. be arranged as a fluidly controlled exhaust valve which is controlled to be opened/closed by means of receiving a flow of pressurized fluid, such as e.g. pressurized hydraulic fluid or a pneumatic flow.

According to an example embodiment, the cam phaser may advance the exhaust event in the range between 20-80 crank angle degrees (CAD). Other CAD are also conceivable. However, the range between 20-80 CAD may be particularly advantageous.

According to a second aspect, there is provided a valve arrangement for an internal combustion engine comprising an exhaust gas aftertreatment system, the valve arrangement comprising at least one inlet valve configured to be arranged in an open position during an air intake event of the internal combustion engine, and at least one exhaust valve configured to be arranged in an open position during an exhaust event of the internal combustion engine; the valve arrangement further comprising a piston arrangement comprising a piston having piston end portion facing the inlet valve, wherein the piston end portion and the inlet valve are arranged at a distance from each other when the inlet valve is arranged in a closed position; wherein the valve arrangement comprises a control unit configured to receive a signal indicative of a temperature level of the exhaust gas aftertreatment system and when the signal indicates a temperature level below a predetermined threshold level: transmit a control signal to the valve arrangement for advancing the exhaust event of the internal combustion engine; and transmit a control signal to the valve arrangement for reducing the distance between the piston end portion and the inlet valve before the internal combustion engine assumes the air intake event.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

According to an example embodiment, the piston arrangement may comprise a cylinder housing the piston, wherein the piston comprises a piston rear end portion arranged at an opposite side relative the piston end portion, the piston rear end portion being arranged at a rear end of the cylinder.

The fluid flow is thus supplied to the cylinder housing and acts on the piston rear end for forcing the piston end portion towards the inlet valve.

According to an example embodiment, the piston arrangement may comprise a piston valve arranged in fluid communication with the rear end of the cylinder.

According to an example embodiment, the piston arrangement may comprise a check valve in fluid communication with the piston.

Hereby, when the fluid flow supplied to the piston arrangement is below a predetermined limit, i.e. at a low-pressure mode, the check valve is closed. When, on the other hand, the fluid flow is equal to, or exceeds the predetermined limit, the check valve is opened to supply the fluid flow to the cylinder housing.

According to an example embodiment, the check valve may be configured to be arranged in an active position when the control unit transmits a control signal to the valve arrangement for reducing the distance between the piston end portion and the inlet valve.

The check valve is thus arranged in the active position, i.e. open, when supplying the flow of fluid to the cylinder housing. When the piston end portion reaches the inlet valve, i.e. when the piston end portion is in abutment with the inlet valve, the check valve will be closed. Hereby, return flow of fluid from the cylinder housing is prevented.

According to an example embodiment, the inlet valve may be connected to an inlet cam shaft and the exhaust valve may be connected to an exhaust cam shaft, the inlet cam shaft being separate from the exhaust cam shaft.

Separate inlet and outlet cam shafts are thus provided. The two cam shafts can be operated individually without mutual relationship between one another.

According to an example embodiment, the valve arrangement may comprise a rocker arm connected to the inlet cam shaft, the piston arrangement being arranged in the rocker arm.

A rocker arm should be construed as an oscillating lever arm that conveys radial movement from the cam lobe into linear movement at the inlet valve to open the inlet valve.

Further effects and features of the second aspect are largely analogous to those described above in relation to the first aspect.

According to a third aspect, there is provided a vehicle comprising an internal combustion engine and a valve arrangement according to any one of the embodiments described above in relation to the first aspect.

Effects and features of the third aspect are largely analogous to those described above in relation to the first and second aspects.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features and advantages, will be better understood through the following illustrative and non-limiting detailed description of exemplary embodiments, wherein.

DETAILED DESCRIPTION

The present disclosure will now be described more fully hereinafter with reference to the accompanying drawings, in which an exemplary embodiment is shown. The disclosure may, however, be embodied in many different forms and should not be construed as limited to the embodiment set forth herein; rather, this embodiment is provided for thoroughness and completeness. Like reference character refer to like elements throughout the description.

Figure 1:
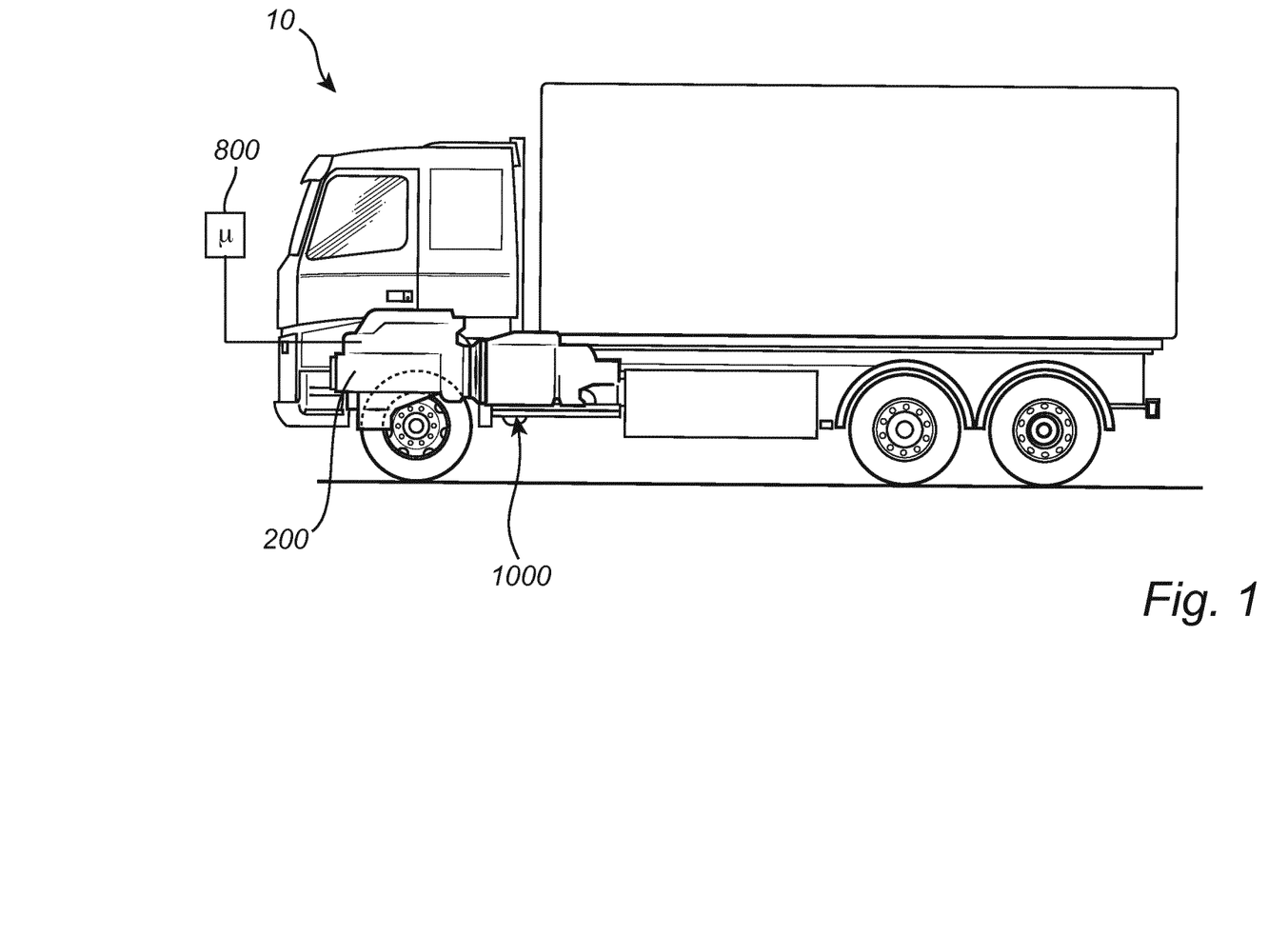
FIG. 1 is a lateral side view illustrating an example embodiment of a vehicle in the form of a truck.

With particular reference to FIG. 1, there is provided a vehicle 10 in the form of a truck. The vehicle 10 comprises a prime mover 200 in the form of an internal combustion engine arrangement 200. The internal combustion engine arrangement 200 may preferably be propelled by e.g. a conventional fuel such as diesel, although other alternatives are conceivable. The internal combustion engine 200 is preferably operated in a four-stroke fashion, i.e. operated by an intake stroke, a compression stroke, a combustion stroke, and an exhaust stroke. As further depicted in FIG. 1, the internal combustion engine arrangement 200 also comprises a control unit 800 for controlling operation of the internal combustion engine arrangement 100. The control unit 800 is thus preferably arranged to control the valve arrangement described below.

Figure 2:
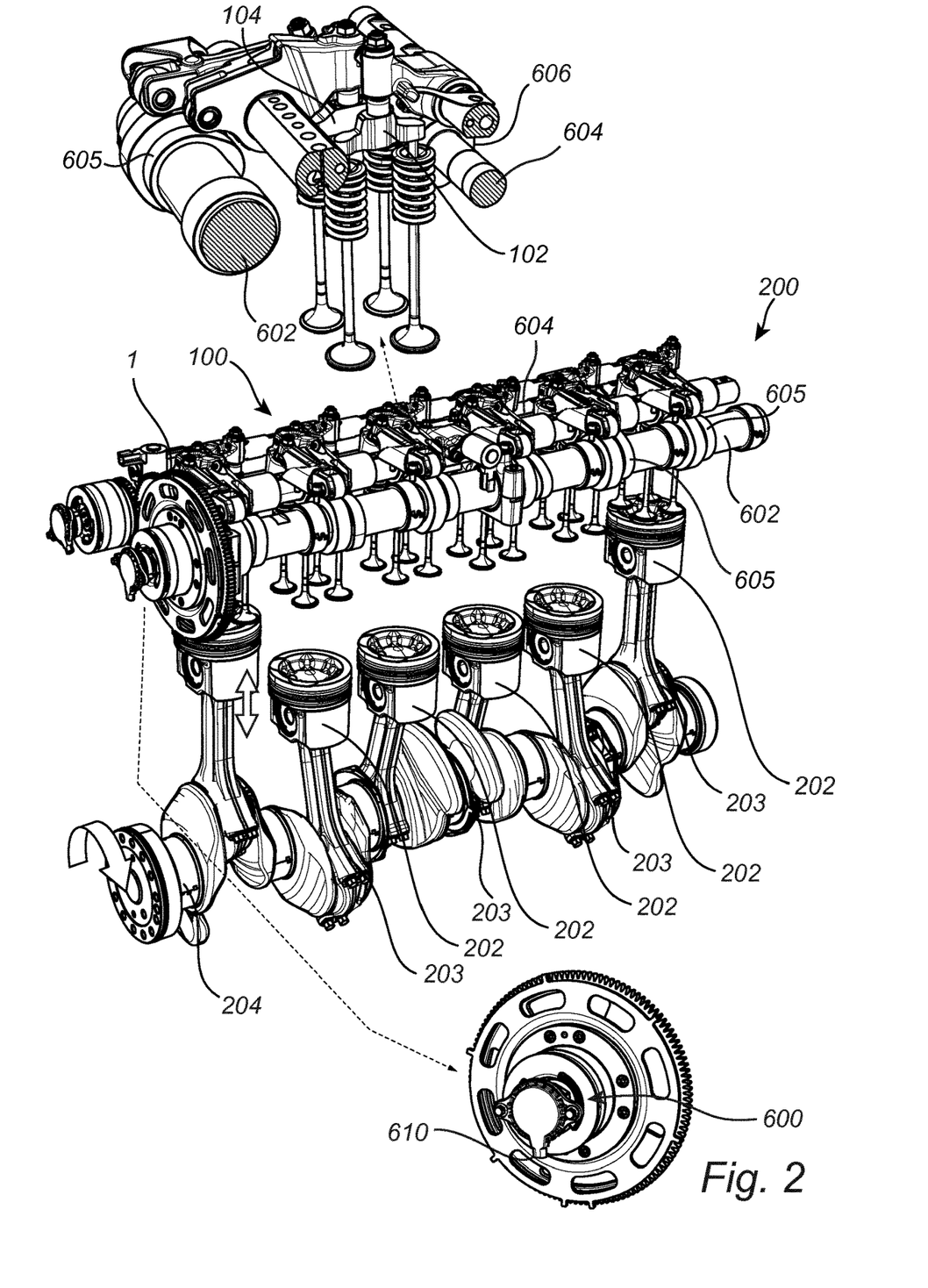
FIG. 2 is a schematic illustration of an internal combustion engine arrangement according to an example embodiment.

Turning to FIG. 2 which is a schematic illustration of an internal combustion engine arrangement according to an example embodiment. For simplicity of illustration, the combustion cylinders and engine blocks of the internal combustion engine have been removed.

As can be seen, the internal combustion engine 200 comprises combustion pistons 202 connected to a crankshaft 204 via a respective connecting rod 203, whereby each piston reciprocates within a respective cylinder (not shown)

between a top dead center (TDC) and a bottom dead center (BDC). The internal combustion engine 200 further comprises a valve arrangement 100. The valve arrangement 100 comprising inlet valves 102 which are arranged to be opened for receiving air into a combustion chamber. The inlet valve 102 is arranged to be open during an air intake event of the internal combustion engine. As is further depicted, each inlet valve 102 is connected to an inlet cam shaft via a respective inlet cam lobe 606. Thus, during rotation of the inlet cam shaft 604, the inlet cam lobe 606 will, once every revolution of the inlet cam shaft 604 push the inlet valve 102 downwards to an open position where air is supplied into the combustion chamber. It should be readily understood that the inlet valve 102, cam shaft 604 and inlet cam lobe 606 in FIG. 2 is merely schematically depicted and details of an example embodiment are given below in relation to description of FIG. 3.

As can also be seen in FIG. 2, the valve arrangement 100 further comprises outlet valves 104 which are arranged to be opened for exhausting combusted residual gas from the combustion chamber. The exhaust valve 104 is arranged to be open during an exhaust event of the internal combustion engine. As is further depicted, each exhaust valve 104 is connected to an exhaust cam shaft 602 via a respective exhaust cam lobe 605. Thus, during rotation of the exhaust cam shaft 602, the exhaust cam lobe 605 will, once every revolution of the exhaust cam shaft 602 push the exhaust valve 104 downwards to an open position for exhausting combusted residual gas out from the combustion chamber.

The air intake event and the exhaust event will be described in further detail below with reference to description of FIG. 4.

As is depicted in the enlarged portion of FIG. 2, the valve arrangement 100 further comprises a cam phaser 600 connected to the exhaust cam shaft 602. The cam phaser 600 is arranged to rotate the exhaust cam shaft 602 such as to be able to advance or delay the exhaust event. The cam phaser comprising an inlet (not shown) which is connected to a source of fluid (not shown). The source of fluid can hereby controllably supply a flow of pressurized fluid to the cam phaser for rotation of the exhaust cam shaft 602. The provision of pressurized fluid is preferably controlled by means of a control signal received from the control unit 800 depicted in FIG. 1.

Figure 3:
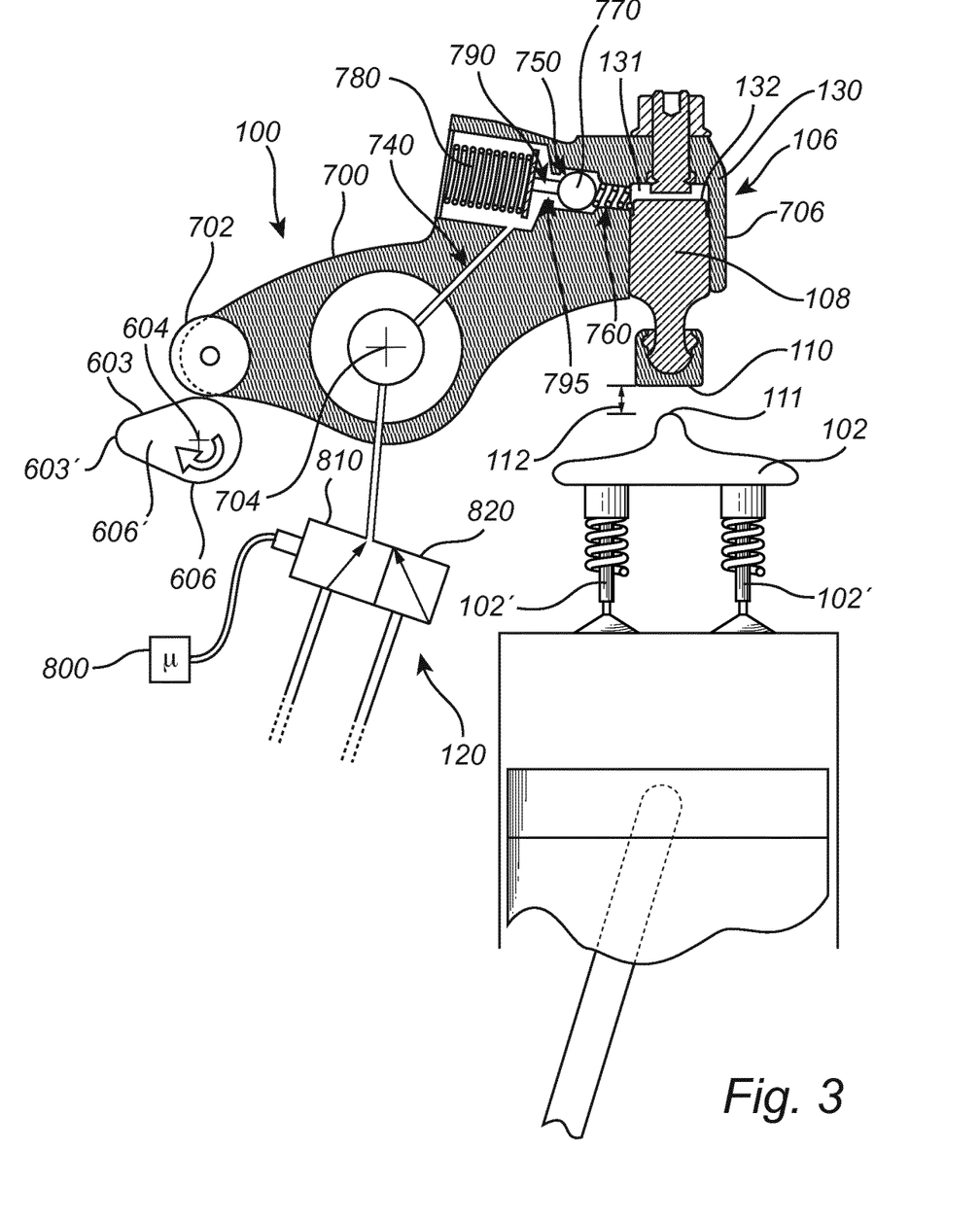
FIG. 3 is a schematic illustration of a portion of the valve arrangement according to an example embodiment.

Turning now to FIG. 3 which is a schematic illustration of a portion of the valve arrangement 100 according to an example embodiment. In particular, FIG. 3 illustrates a detailed example embodiment of the inlet valve 102 and its connection to the inlet cam lobe 606. As can be seen, the inlet valve 102, which in the example embodiment comprises a caliper and two inlet valves 102', is connected to the inlet cam lobe 606 and inlet cam shaft 604 via a rocker arm 700. Hereby, when the inlet cam lobe 606 is rotated, a protruding portion 606', having a lower part 603 and an upper part 603', will push a rear end 702 of the rocker arm 700 upwards. This upward motion of the rear end 702 will force the rocker arm to rotate around a rocker arm shaft 704 and push a front portion 706 of the rocker arm 700 downwards. In particular, the valve arrangement 100 comprises a piston arrangement 106 at the front portion 706 of the rocker arm 700. When the inlet cam lobe 606 pushes the rear end 702 of the rocker arm 700, a piston end portion 110 is pushed downwards to subsequently force the inlet valve to be arranged in the open position.

As is further evident from FIG. 3, the piston end portion 110 and an upper portion 111 of the inlet valve 102 are arranged at a distance 112, also referred to as a lash, from each other when the inlet valve is arranged in a closed position, in particular at a state before the inlet cam lobe 606 pushes the rear end 702 of the rocker arm 700 in the upward direction.

Particular detailed reference is now made to the piston arrangement 106 of the valve arrangement 100. As can be seen, the piston arrangement 106 comprises a piston 108 positioned in a cylinder 130. The piston 108 comprises a piston rear end portion 132 at the rear end of the cylinder 130. The piston rear end portion 132 is thus positioned on an opposite side of the piston 108 relative the piston end portion 110. An upper volume 131 is thus formed at the rear end of the cylinder 130. The upper volume 131 is thus defined by the volume delimited by the cylinder 130 and the piston rear end portion 132.

Moreover, the upper volume 131 is arranged to receive pressurized fluid from e.g. a pump (not shown) comprising pressurized fluid. Hereby, pressurized fluid is controllably supplied to the upper volume 131 via a piston valve 120 and a check valve 750, whereby the piston 108 is movable downwards to reduce the distance 112 between the piston end portion 110 and the inlet valve 102. The piston valve 120, which is merely schematically depicted in FIG. 3, is controllable to be positioned in a low-pressure mode 810 and a high-pressure mode 820. The piston valve 120 is preferably connected to the control unit 800 for being controlled between the low-pressure mode 810 and the high-pressure mode 820.

When the piston valve 120 is arranged in the high-pressure mode 820, a fluid flow of relatively high pressure is supplied through the piston valve 120 and further directed to the check valve 750 via an inlet 740. The check valve 750 comprises a spherical member 770, such as a spherical ball, activated or deactivated depending of position of a trunk 790. When fluid is supplied in the high-pressure mode 820, the spring 780 is compressed and moved to the left in FIG. 3 and the trunk 790 is not in contact with the spherical member 770 and check valve 750 will be active. The high-pressure fluid in mode 820 will pass by the spherical member 770 further on to the upper volume 131 of the cylinder 130. This will cause the piston 108 to move downwards until the piston end portion 110 is in abutment with the upper portion 111 of the inlet valve. The high-pressure fluid is now acting all around the spherical member 770 and the small spring 760 will bias the spherical member 770 towards a seat 795 and trapping fluid in volume 131. The complete movement from cam lobe 603 and 603', without any lash, will be transferred to valve 102.

When the piston valve 120 is arranged in the low-pressure mode 810, fluid flow is directed to the inlet 740 of the check valve 750. However, the pressure level of the fluid flow when the piston valve 120 assumes the low-pressure mode 810 is not sufficient to compress the spring 780 and the trunk 790 will move the spherical member 770 to the right, away from seat and sealing position and check valve 750 is deactivated. The fluid can pass by, in both directions, around the spherical member 770. When movement is transferred of the lower part of cam lobe 603 it is absorbed as lash 112, due to the fluid in volume 131 is evacuated through back flow passing the inactive spherical member 770. Only the upper part of cam lobe 603', which is higher than the lash 112, will be transferred to valve 102.

Figure 4:
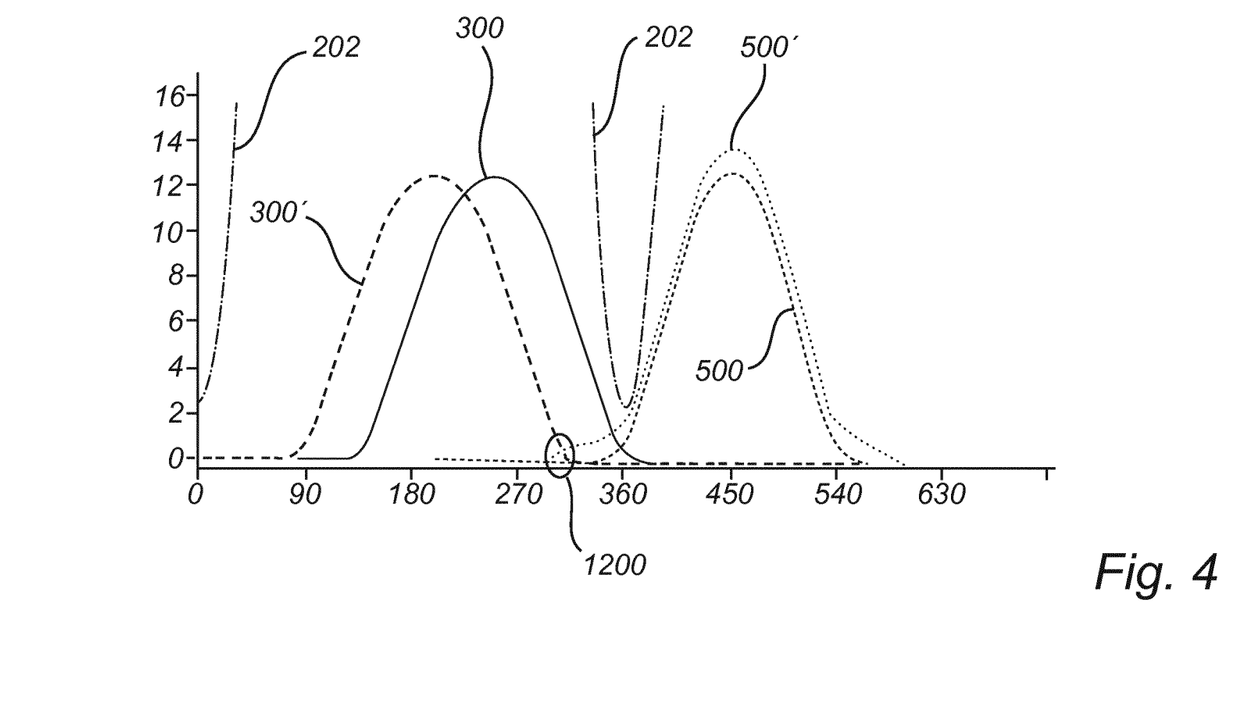
FIG. 4 is a graph illustrating the opening characteristics of the inlet valve and the exhaust valve according to an example embodiment.
Figure 5:
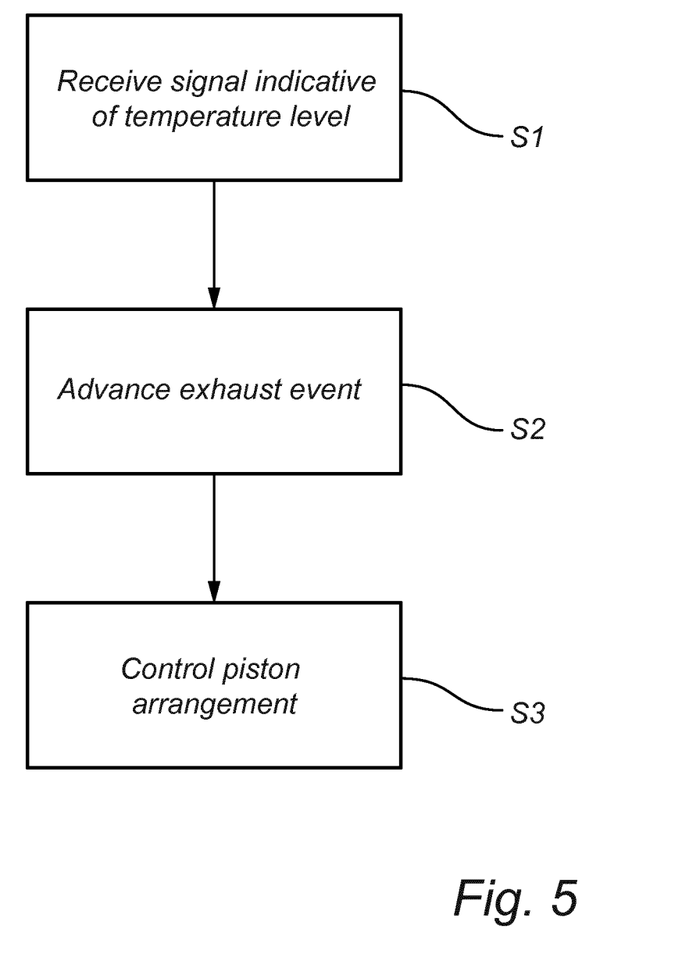
FIG. 5 is a flow chart of a method for controlling the valve arrangement according to an example embodiment.

Turning now to FIGS. 4 and 5 in combination with FIG. 3 for description of a method for controlling the valve arrangement 100 according to an example embodiment. Starting with FIG. 4, which is a graph illustrating the movement of the combustion piston 202, the inlet valve 102 and the exhaust valve 104. Starting with the curve 202 showing the distance between the combustion piston and the closed valves 102 and 104. The opening characteristics of the exhaust valve 104 during normal, conventional operation is depicted by the solid line numbered 300. Thus, solid line 300 depicts the exhaust gas event 300 during conventional operation. Turning to the inlet valve, its opening characteristics during normal, conventional operation is depicted by dotted line numbered 500. Thus, the dotted line 500 depicts the air intake event 500 during conventional operation. As can be seen, the inlet valve 102 and the exhaust valve 104 are both opened at the same time during a short time period when the combustion piston 202 is arranged at TDC. Hence, there is a valve overlap during this relatively short time period.

However, when there is a desire to relatively rapidly heat up the exhaust gas aftertreatment system (schematically illustrated by reference numeral 1000 in FIG. 1), the valve arrangement 100 is controlled for increasing the heat exhausted towards the exhaust gas aftertreatment system. Hereby, the control unit 800 receives S1 a signal indicative of the temperature level of the exhaust gas aftertreatment system. This signal can be received from e.g. a measurement made upstream the exhaust gas aftertreatment system. Various ways of determining the temperature level are conceivable and known to the skilled person.

When the signal indicates that the temperature level of the exhaust gas aftertreatment system is below a predetermined threshold level, the control unit 800 transmits a control signal to the cam phaser 600. The cam phaser 600 hereby advances S2 the exhaust event, which is illustrated in FIG. 4 with broken line numbered 300'. According to a non-limiting example, the exhaust event is advanced approximately 20-80 crank angle degrees (CAD). Hereby, the exhaust valve will be opened significantly before the combustion piston 202 reach the bottom dead center. The exhaust valve 104 will thus also be closed at an earlier point in time compared to the conventional exhaust event numbered 300.

Furthermore, the control unit 800 will also control S3 the piston arrangement 106 to reduce the distance 112 between the piston end portion 110 and the inlet valve 102 before the internal combustion engine assumes the air intake event. This is accomplished as described above, i.e. that the control unit 800 controls the piston valve 120 to assume the high-pressure mode 820 for directing a flow of high-pressure fluid to the upper volume 131 of the cylinder 130. Hereby, the piston end portion 110 will be moved downwards and arranged in abutment with the upper portion 111 of the inlet valve 102 before the internal combustion engine assumes the air intake event. As a result, the opening characteristics of the inlet valve 102 will be modified in comparison to the air intake event 500 during conventional operation. The modified air intake event is depicted with dotted line numbered 500'. As the distance 112 has been reduced, the intake valve 102 will be initially opened at an earlier point in time but to a relatively small amount. This is due to the shape of the inlet cam lobe which will initially open the inlet valve already when the lower part 603 of the inlet cam lobe 606 pushes onto the rear end 702 of the rocker arm 700.

By means of advancing the exhaust event and to reduce the distance between the piston end portion 110 and the inlet valve 102 before the internal combustion engine assumes the air intake event, a valve overlap 1200 is achieved where both the inlet valve and the exhaust valve are arranged in an open position, without the risk of interference between the inlet valve 102 and the combustion piston 202. As can also be seen in FIG. 4, the maximum openness degree of the inlet valve is larger for the dotted line numbered 500' compared to the maximum openness degree for the inlet valve during conventional operation depicted by reference numeral 500. However, at this point in time, the combustion piston is positioned at BDC, or close to the BDC.

It is to be understood that the present disclosure is not limited to the embodiments described above and illustrated in the drawings; rather, the skilled person will recognize that many changes and modifications may be made within the scope of the appended claims.

The invention claimed is:

1. A method for controlling a valve arrangement of an internal combustion engine comprising an exhaust gas aftertreatment system, the valve arrangement comprising at least one inlet valve configured to be arranged in an open position during an air intake event of the internal combustion engine, and at least one exhaust valve configured to be arranged in an open position during an exhaust event of the internal combustion engine; the valve arrangement further comprising a piston arrangement comprising a piston having a piston end portion facing the inlet valve, the piston being arranged to controllably position the inlet valve in the open position, wherein the piston end portion and the inlet valve are arranged at a distance, by means of an air gap, from each other when the inlet valve is arranged in a closed position; the method comprising the steps of:
  receiving a signal indicative of a temperature level of the exhaust gas aftertreatment system and when the signal indicates a temperature level below a predetermined threshold level:
  advancing the exhaust event of the internal combustion engine; and
  controlling the piston arrangement for reducing the distance between the piston end portion and the inlet valve before the internal combustion engine assumes the air intake event.

2. The method according to claim 1, wherein the step of controlling the piston arrangement comprises the step of advancing the piston end portion towards the inlet valve until the piston end portion abuts the inlet valve.

3. The method according to claim 1, wherein the piston arrangement is a fluidly controllable piston arrangement.

4. The method according to claim 3, wherein the piston arrangement comprises a piston valve controllable between a low-pressure mode, in which fluid flow of a first flow pressure level is supplied towards the piston, and a high-pressure mode, in which fluid flow of a second flow pressure level is supplied towards the piston, the second flow pressure level being higher than the first flow pressure level.

5. The method according to claim 4, wherein the step of controlling the piston arrangement comprises the step of controlling the piston valve from the low-pressure mode to the high-pressure mode.

6. The method according to claim 4, wherein the second flow pressure level is of such magnitude that the distance between the piston end portion and the inlet valve is reduced without arranging the inlet valve in the open position when the piston end portion abuts the inlet valve.

7. The method according to claim 4, wherein the valve arrangement comprises a cam phaser connected to the exhaust valve via an exhaust cam shaft.

8. The method according to claim 7, wherein the step of advancing the exhaust event comprises the step of:
  rotating the exhaust cam shaft, using the cam phaser, for advancing the exhaust event.

9. The method according to claim 8, wherein the cam phaser advances the exhaust event in the range between 20-80 crank angle degrees.

10. A valve arrangement for an internal combustion engine comprising an exhaust gas aftertreatment system, the valve arrangement comprising at least one inlet valve configured to be arranged in an open position during an air intake event of the internal combustion engine, and at least one exhaust valve configured to be arranged in an open position during an exhaust event of the internal combustion engine; the valve arrangement further comprising a piston arrangement comprising a piston having piston end portion facing the inlet valve, wherein the piston end portion and the inlet valve are arranged at a distance, by means of an air gap, from each other when the inlet valve is arranged in a closed position; wherein the valve arrangement comprises a control unit configured to:
- receive a signal indicative of a temperature level of the exhaust gas aftertreatment system and when the signal indicates a temperature level below a predetermined threshold level:
- transmit a control signal to the valve arrangement for advancing the exhaust event of the internal combustion engine; and
- transmit a control signal to the valve arrangement for reducing the distance between the piston end portion and the inlet valve before the internal combustion engine assumes the air intake event.

11. The valve arrangement according to claim 10, wherein the piston arrangement comprises a cylinder housing the piston, wherein the piston comprises a piston rear end portion arranged at an opposite side relative the piston end portion, the piston rear end portion being arranged at a rear end of the cylinder.

12. The valve arrangement according to claim 11, wherein the piston arrangement comprises a piston valve arranged in fluid communication with the rear end of the cylinder.

13. The valve arrangement according to claim 10, wherein the piston arrangement comprises a check valve in fluid communication with the piston.

14. The valve arrangement according to claim 13, wherein the check valve is configured to be arranged in an active position when the control unit transmits a control signal to the valve arrangement for reducing the distance between the piston end portion and the inlet valve.

15. The valve arrangement according to claim 10, wherein the inlet valve is connected to an inlet cam shaft and the exhaust valve is connected to an exhaust cam shaft, the inlet cam shaft being separate from the exhaust cam shaft.

16. The valve arrangement according to claim 15, wherein the valve arrangement comprises a rocker arm connected to the inlet cam shaft, the piston arrangement being arranged in the rocker arm.

17. A vehicle comprising an internal combustion engine and a valve arrangement according to claim 10.

* * * * *